United States Patent [19]
Uchisawa et al.

[11] Patent Number: 5,653,419
[45] Date of Patent: Aug. 5, 1997

[54] DIAPHRAGM TYPE HIGH PRESSURE SHUT-OFF VALVE

[75] Inventors: Osamu Uchisawa; Jun Yamashima, both of Sendai, Japan

[73] Assignee: Kabushiki Kaisha Motoyama Seisakusho, Miyagi-ken, Japan

[21] Appl. No.: 525,545

[22] PCT Filed: Mar. 22, 1994

[86] PCT No.: PCT/JP94/00457

§ 371 Date: Nov. 6, 1995

§ 102(e) Date: Nov. 6, 1995

[87] PCT Pub. No.: WO94/21951

PCT Pub. Date: Sep. 29, 1994

[30] Foreign Application Priority Data

Mar. 19, 1993 [JP] Japan .................... 5-060039

[51] Int. Cl.$^6$ ................ F16K 7/11; F16K 31/122; F16K 31/16; F16K 31/54

[52] U.S. Cl. ............ 251/58; 92/130 D; 92/136; 251/63.6; 251/250; 251/263; 251/331

[58] Field of Search ............ 251/58, 63.5, 63.6, 251/229, 250, 263, 331, 335.2; 92/130 R, 130 A, 130 D, 133, 136

[56] References Cited

U.S. PATENT DOCUMENTS

| | | | |
|---|---|---|---|
| 4,087,074 | 5/1978 | Massey et al. | 251/58 |
| 4,260,128 | 4/1981 | Tito | 251/58 |
| 4,354,424 | 10/1982 | Nordlund | 92/136 |
| 4,566,670 | 1/1986 | Nordlund | 251/58 |
| 4,651,626 | 3/1987 | Messina | 92/133 |
| 4,700,735 | 10/1987 | Hamernik et al. | 251/58 |
| 5,108,069 | 4/1992 | Tada et al. | 251/58 |
| 5,253,671 | 10/1993 | Kolenc | 251/58 |

*Primary Examiner*—George L. Walton
*Attorney, Agent, or Firm*—Marshall, O'Toole, Gerstein, Murray & Borun

[57] ABSTRACT

The invention has its object to provide a diaphragm type high pressure shut-off valve which is simple in external shape, can realize miniaturization and is convenient in handling.

The shut-off valve comprises a cylindrical housing (10) having a supply unit for compressed air at its end in an axial direction (Q), a piston (19) provided in the housing (10) and adapted to reciprocate in response to the compressed air, a return spring (20) provided in the housing (10) so as to permit the piston (19) to return, a rack portion (19A) provided to extend from the piston (19), a cam pinion (17) having a pinion portion (17B) provided integrally with the pinion portion (17B) and a rotating shaft (18) supported by the housing (10), and a diaphragm (7) adapted for movement in response to displacements of stems (9,13) and abutting against the cam face portion (17A) of the cam pinion (17). As A drive mechanism and an energizing mechanism are accommodated in the single cylindrical housing, it is possible to realize adequate miniaturization and simplification to thereby contribute to reduction of the number of parts.

13 Claims, 6 Drawing Sheets

DIAPHRAGM TYPE HIGH PRESSURE SHUT-OFF VALVE

FIELD OF THE INVENTION

The present invention relates to a diaphragm type high pressure shut-off valve provided in a gas piping system for introducing or shutting off a high pressure and high purity gas used for production of, for instance, semiconductor devices or the similar purposes.

BACKGROUND TECHNOLOGY

As this type of diaphragm type high pressure shut-off valve, there has been known, for instance, the one described in Japanese Utility Model Laid-Open Publication No. 131077/1989. In the diaphragm type high pressure shut-off valve described above, a first housing for accommodating a driving mechanism comprising a piston, a coil spring or the like and a second housing for accommodating a power amplifying mechanism comprising a rack pinion, an eccentric disk cam or the like are provided, a rack for the driving mechanism for supplying compressed air or reducing a pressure thereof is moved in a direction crossing a pulsating direction of the diaphragm, a circular and eccentric disk cam of the power amplifying mechanism is rotated in association with movement of the rack described above, and a valve hole is kept in the open or closed state by a diaphragm contacting an edge portion of a stem contacting the disk cam in its axial direction.

With the configuration based on the conventional technology described above, however, the first and second housings are located side by side, and especially the driving mechanism drives in a direction perpendicular to a direction of pulsation of the diaphragm, so that there are some restriction in minimization of the housing due to technological limits in development of material for each mechanism when the present application was filed, and also stress is placed only on the functions and the external shape is ignored so that the structure has rather an irregular form, and for this reason the conventional type of diaphragm high pressure shut-off valve is inconvenient in handling and causes many troubles in designing of a piping system or installation thereof. For instance, when a plurality of shut-off valves are provided side by side, sometimes a length in a direction along which the plurality of shut-off valves are laid may become too long, of physical interference may occur between adjoining shut-off valves, which is disadvantageous.

It should be noted that, in the U.S. Pat. No. 4,700,735, as understood from FIG. 10 and FIG. 11 thereof, a configuration enabling solution of the disadvantages caused by providing said first and second housings side by side is disclosed. In this configuration described above, a first accommodating portion for accommodating a driving mechanism for driving a coil spring, a piston or the like and a second accommodating portion for accommodating a pinion and a power amplifying mechanism for an eccentric cam each attached discretely to the same shaft are provided in a housing, the second accommodating portion is covered with two sheets of detachable plates, the first accommodating portion is piled up on the second accommodating portion for realizing a two-layered construction, a rack provided so that it hangs down over the piston is abutting the pinion, the diaphragm is pulsated by a stem contacting the eccentric cam, thus a valve hole being opened or closed.

In the configuration described above, however, the housing is two-layered, or it is necessary to use a plate for covering, so that adequate simplification in at least the general external shape has not been achieved.

In addition the coil spring is accommodated in the first accommodating portion, so that a length thereof is limited to a substantially half of the full height, and for this reason, energized force is limited according to the length, which is a severe restriction in minimization of the configuration.

Furthermore the configuration comprises various components such as a piston, a rack, a pinion, an eccentric cam or the like, so that a number of parts and a number of processes for assembling the parts are apt to become larger.

Furthermore in the two examples of the conventional technology, the power amplifying mechanism comprises an eccentric cam obtained by making eccentric a circular disk cam moving in response to driving of the driving mechanism, and the eccentric cam rotates according to displacement caused by pulsation of the diaphragm, so that a change in a power amplifying ratio of the power amplifying mechanism due to rotation of the eccentriccam (a ratio of a driving force of the driving portion and a load to the diaphragm) does not coincide with the pulsation characteristics of the diaphragm. In other words, the load may be small when an operation of the diaphragm for closing a valve is started, but a large load is required around a timing when the valve is completely closed, which is contradictory to the pulsation characteristics.

Furthermore, as displacement due to pulsation of the diaphragm is dominated by eccentricity of the eccentric cam, so that only a quite narrow portion of a rotational angle of the eccentric cam contributes to displacement of the diaphragm, and for this reason not only adjustment thereof is quite difficult, but also an adjusting mechanism for adjusting a position of a stem against the eccentric cam is required for each type of product, and it is disadvantageously difficult to keep performance of products in a fixed range.

It is an object of the present invention to provide a diaphragm type high pressure shut-off valve having a simplified external shape, adapted for minimization, convenient in handling, operating in response to the pulsation characteristics of the diaphragm, and enabling minimization of dispersion in terms of quality among products.

DISCLOSURE OF THE INVENTION

To achieve the object as described above, the main configuration according to the present invention is characterized in that the diaphragm type high pressure shut-off valve according to the present invention having a diaphragm for setting a valve hole for a gas piping system to the open or closed state by increasing or reducing a pressure of compressed air comprises a cylindrical housing having a supply unit for the compressed air at its edge in the axial direction, a piston provided in the housing to reciprocate in response to increase or decrease of a pressure of the compressed air, a return spring provided in the housing to energize the piston against a pressure of the compressed air, a rack portion integrally formed with and extending from the piston and also having abutting teeth provided along the direction of reciprocal movement of the piston, a pinion abutting the rack portion, a cam surface portion integrally provided with the pinion portion, and a cam pinion supported by the housing and having a rotating shaft extending in a direction perpendicular to the axial direction, and that rotational displacement of the cam surface portion of the cam pinion is delivered through a stem to the diaphragm provided at another edge in the axial direction.

FUNCTION

In a case, for instance, an always-closed type, compressed air supplied to a pressure receiving surface of the piston is reduced, the piston is moved to the direction of anti-diaphragm by energizing force of the return spring, and the rack portion provided integrally with the piston described above is moved to the same direction thereof. With this configuration, abutting rotation in the pinion portion of the cam pinion is started, a stem is moved in the direction of pulsating displacement of the diaphragm along the cam surface portion in accordance with processing of the abutting rotation, and the diaphragm corresponding to the movement makes pulsing displacement in a pressured loaded state through the stem. And if the cam pinion is rotated by only a specified angle, the valve hole becomes a state of the valve completely closed.

DESCRIPTION OF THE REFERENCES 4 valve hole, 7 diaphragm, 9 lower stem, 10 housing, 11 actuator housing portion, 12 actuator cover, 13 upper stem, 16 aligning ball, 17 cam pinion, 17A cam surface portion, 17B pinion portion, 18 rotating shaft, 19 piston, 19A rack portion, 20 return spring, Q axial direction, 101a, 101b rack piston guide, 100, 106 bushe for rack piston guide, 102 needle-shaped roller, 103 needle-shaped roller with external wheels, 104 bonnet, 105 stem on which the roller with external wheels can be mounted, 107 stop screw 107.

BEST MODE FOR CARRYING OUT THE INVENTION

Embodiment 1

Figure 1:
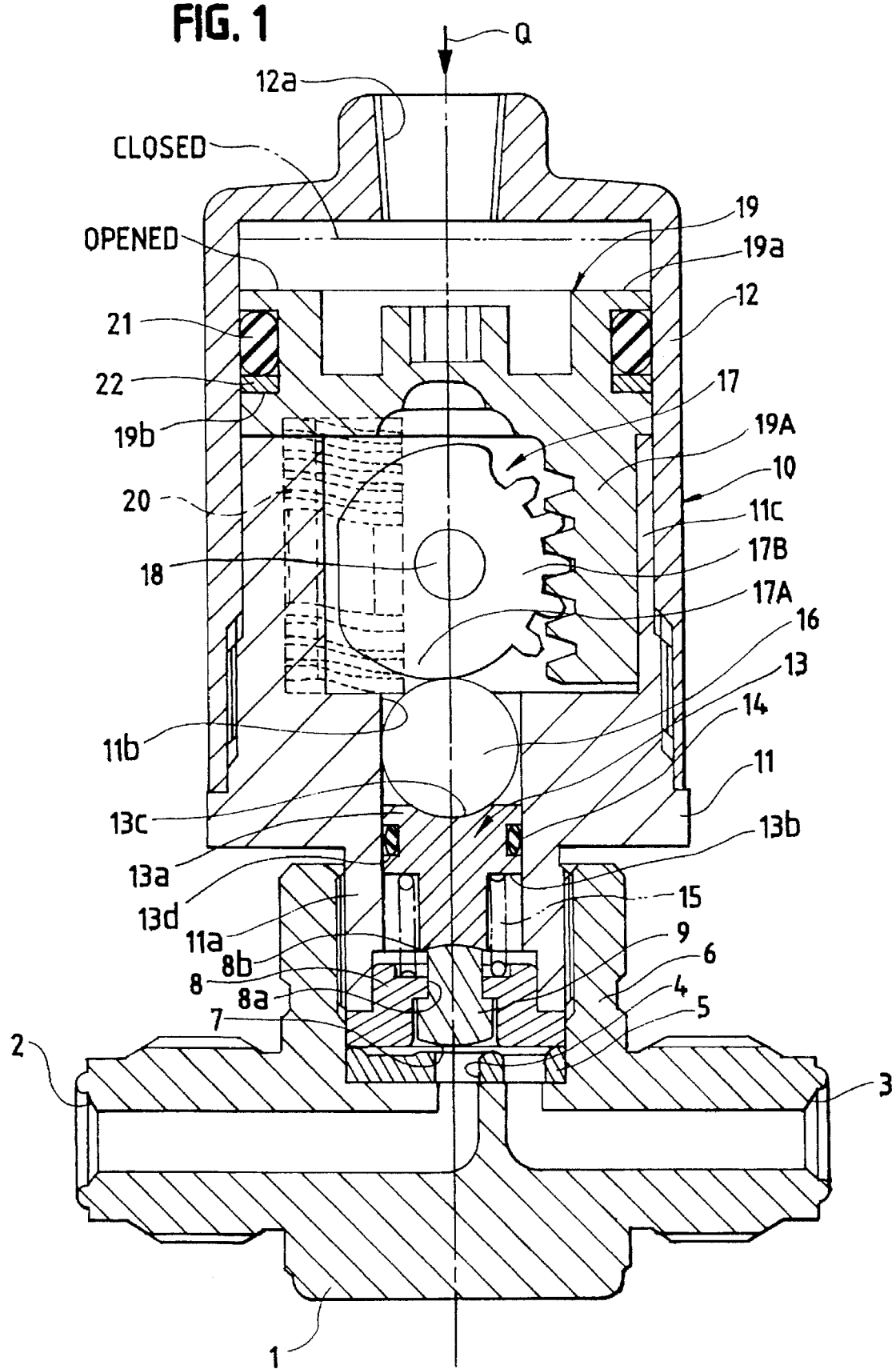
FIG. 1 is a vertical section view of a diaphragm type high pressure shut-off valve according to the embodiments of the present invention.

FIG. 1 shows a preferred embodiment of a diaphragm type high pressure shut-off valve of the always-closed type according to the present invention, and a valve body 1 connected to a gas piping system for flowing a gas, which is a high pressure (e.g. 245 Kgf/cm$^2$) and high purity fluid has a cylindrical valve chamber 6 formed around the valve hole 4 erecting from a position close to a valve head of the valve hole 4 for a seal 5 with the valve hole 4 communicating to an inlet port 2 as well as to an outlet port 3 presented therein to be mounted.

The diaphragm 7 is provided covering the valve hole 4 inside the valve chamber 4 and an actuator button holder 8 is provided to hold a peripheral section of the diaphragm with the seal portions 5. A lower stem 9 having a convex contact surface in a lower section thereof contacts to a vertex surface portion in a counter valve hole of the diaphragm 7. In addition, a guide hole 8a is formed in a upper section of the actuator button holder 8, and an upper section of the lower stem 9 penetrates through the guide hole 8a.

On the other hand, provided above the valve chamber 6 is a substantially cylindrical housing 10, the housing 10 substantially comprises an actuator housing portion 11 in a lower section thereof and an actuator cover portion 12 screwed to the housing 11 so that it is located above the actuator cover 12, and a small diameter portion 11a in a lower section of the actuator housing portion 11 is screwed to the valve chamber 6. It should be noted that a peripheral portion of the actuator button holder 8 is held between a lower edge of the small diameter portion 11a of the actuator housing 11 and the seal portion 5 described above.

Provided above the lower stem 9 is an upper stem 13 with an upper edge of the lower stem 9 and a lower edge of the upper stem 13 formed into a convex state and a concave state respectively, and the two edges abut each other through engagement of the convex and concave portions.

A large diameter head portion 13a is formed in an upper section of the upper stem 13, the large head diameter portion 13a is inserted into an operation hole 11b formed in the actuator housing portion 11 with an O-ring fitted into a circular groove 13d presented in the large diameter head portion 13a. Furthermore a coil spring 15 is spanned between a spring receptor 13b of the large diameter head section 13a and a spring base 8b formed in the upper section of the actuator button holder 8.

Also an aligning ball 16 is provided inside the operation hole 11b, the aligning ball 16 is placed on a concave base surface 13c formed at an upper edge of the upper stem 13, and the aligning ball 16 contacts a cam surface portion 17A of a cam pinion 17.

The cam pinion has a disk-like form as a whole with a said cam surface portion 17A constituting a power amplifying mechanism and a pinion portion 17B connected thereto formed in a substantially semi-circular form respectively therein, and can freely rotate around a rotating shaft 18.

Provided above the cam pinion 17 in the actuator cover portion 12 is a piston 19 constituting a driving mechanism, and in the piston 19 a rack portion 19A abutting the pinion section 17B is integrally provided in a hanging state, and the rack portion 19A reciprocates along a longitudinal direction of the rack guide 11c formed in a portion of a periphery of the actuator housing portion 11.

Provided between the piston 19 and the actuator housing portion 11 is a return spring 20, and a pressure receiving surface 19a, which is an upper surface of the piston 19, faces a compressed air supply port 12n formed in the upper section of the actuator cover portion 12. It should be noted that a circular groove 19b is formed in a peripheral section of the piston 19, and an O-ring 21 and a backup ring 22 are fitted in the circular groove 19b the former placed on the latter.

As described above, in the configuration of the present embodiment, a film center of the diaphragm 7, central axes of the lower step 9 and upper step 13, a center of the aligning ball 16, a rotational center of the cam pinion 17, a central portion of the pressure receiving surface 19a of the piston 19 are provided in a series along the axial direction of the housing 10.

Figure 2:
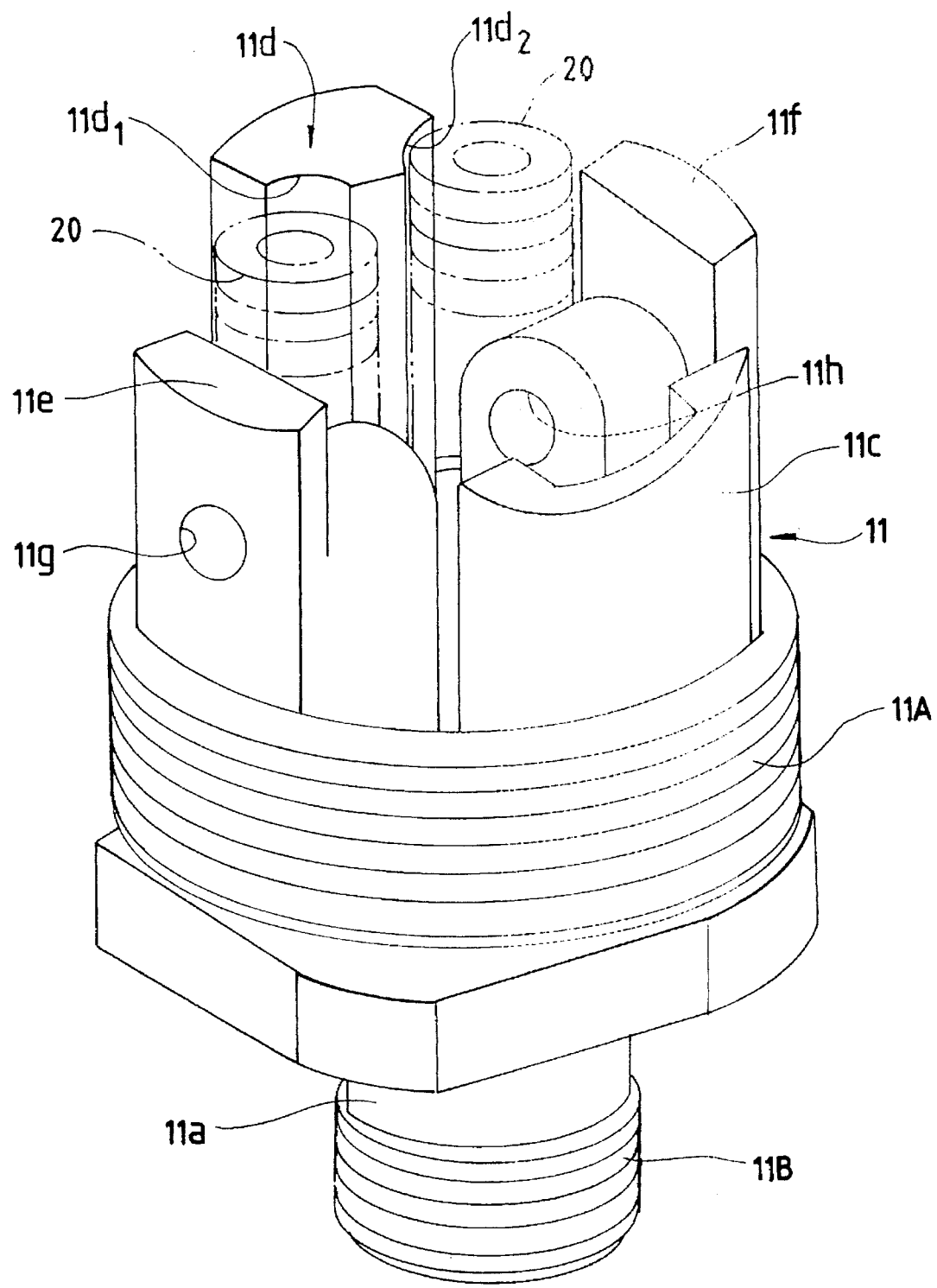
FIG. 2 is a perspective view of an actuator housing shown in FIG. 1.

FIG. 2 show s detailed configuration of the actuator housing portion 11, and spring guide pole 11d is formed at a position facing the rack guide 11c with a pair of lacked round holes $11d_1$, $11d_2$ presented therein for the return spring 20 to be mounted.

Also a pair of bearing blocks 11e, 11f are formed facing each other in both sides of the rack guide 11c, and bearing holes 11g, 11h are formed in the two block 11e, 11f respectively. Herein the cam pinion 17 is provided between the two blocks 11e, 11f, and the cam pinion 17 is born by the rotating shaft 18 penetrated through the bearing holes 11g, 11h.

It should be noted that a male screw portion 11A screwed into a female screw portion of the actuator cover portion 12 is formed in a lower section of the basic body of the actuator housing portion 11, and a male screw portion 11B screwed into a female screw portion of the valve chamber 6 in the valve body 1 is formed in the small diameter section 11a below it.

Figure 3:
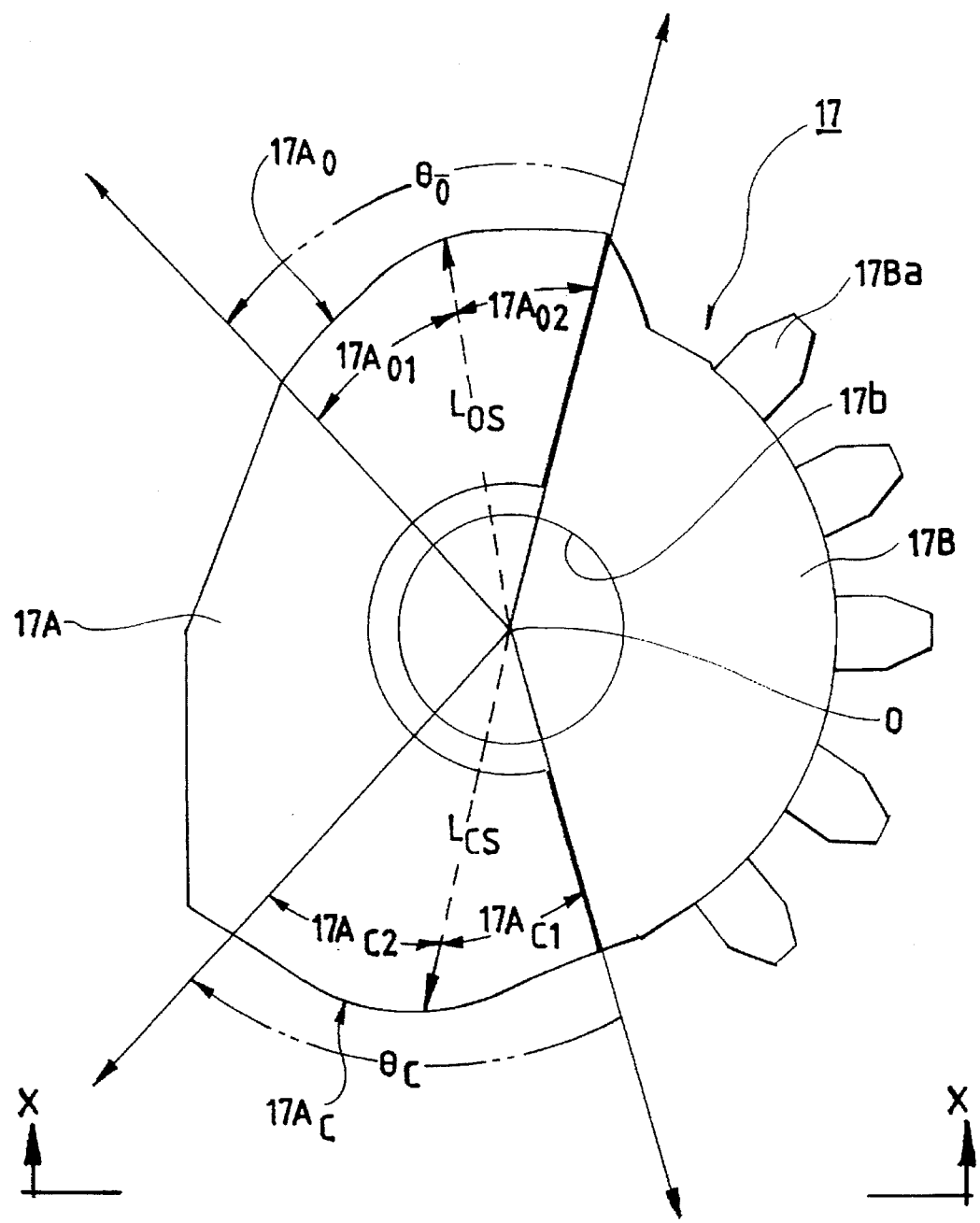
FIG. 3 is a plan view of a cam pinion shown in FIG. 1.
Figure 4:
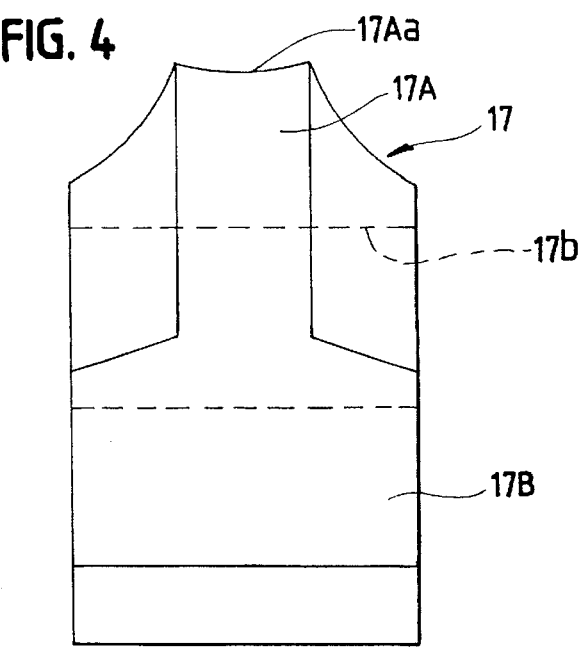
FIG. 4 is a side view of a cam pinion taken along the line F—F in FIG. 3.

FIG. 3 shows a more detailed form of the cam pinion 17, and the cam surface portion 17A comprises a first cam surface portion $17A_c$ formed in a range of an rotating angle C so as to response to a case of always-closed type and a second cam surface portion $17A_o$ formed at a substantially symmetrical position against a center O thereof in a range of the rotating angle O so as to respond to a case of always-open type, and the pinion portion 17B has 5 sheets of abutting teeth 17Ba formed along circles provided at a specified pitch. Herein formed in the cam pinion 17 is a bearing hole 17b for the rotating shaft 18 to be inserted therethrough as shown in FIG. 4, and also formed on the characteristics surface 17Aa of the cam surface portion 17A is a arc surface along a spherical surface of the aligning ball 16. With this configuration, the contacting state between the aligning ball 16 and the cam characteristics surface 17Aa is stabilized.

It should be noted that FIG. 1 shows a mode of mounting the cam pinion 17 when used as an always-closed type, but when used as an always-closed type, the cam pinion is mounted, as shown in FIG. 3, in a state where it is rotated by 180 degrees around a horizontal line passing through the center O of the bearing hole 17b.

As shown in FIG. 3, the first cam surface portion $17A_c$ includes a first cam characteristics surface portion $17A_{c1}$ and a second cam characteristic surface portion $17A_{c2}$ communicated thereto, while the second cam surface portion $17A_o$ includes a first cam characteristics surface portion $17A_{o1}$ and a second cam characteristics surface portion $17A_{o2}$ communicated thereto.

Figure 5:
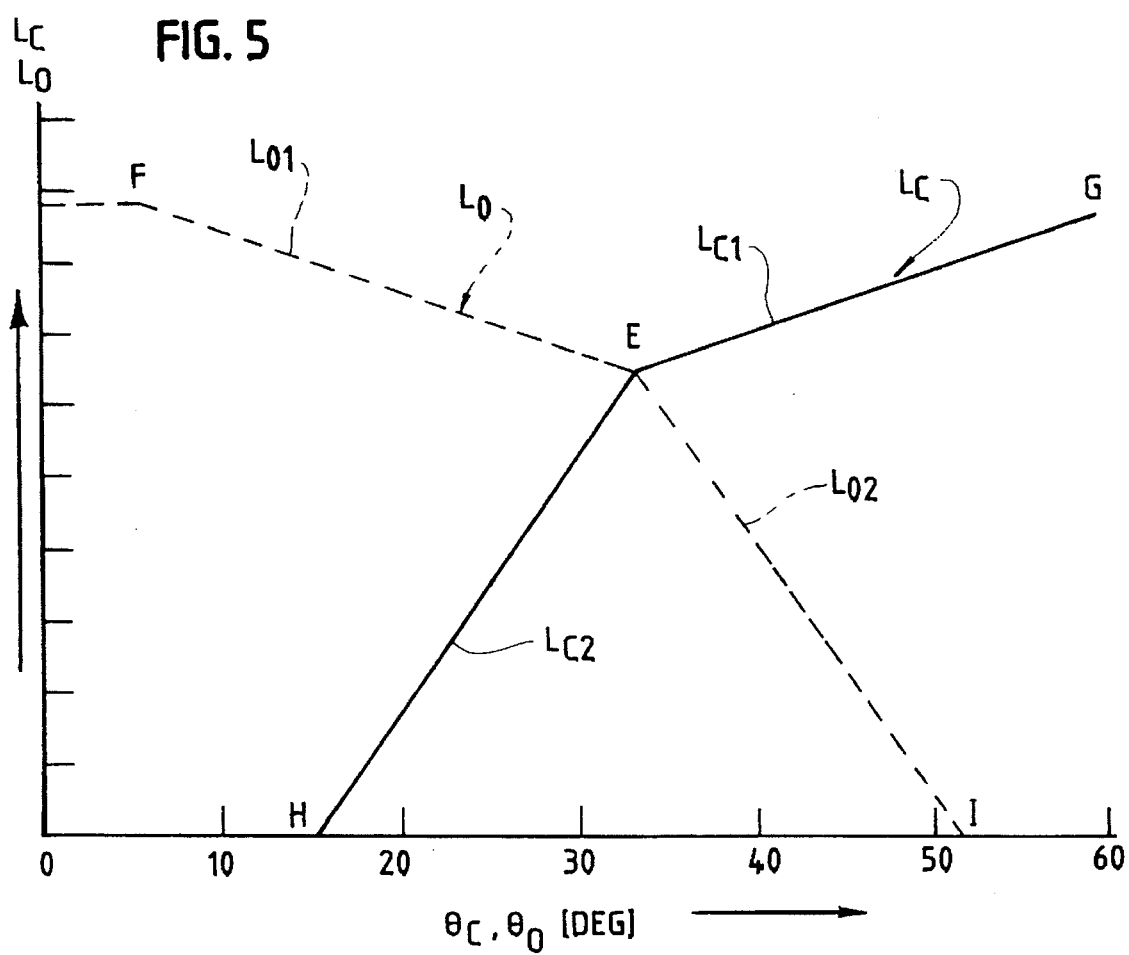
FIG. 5 is a graph illustrating an example of the cam displacement in the cam surface portion of the cam pinion shown in FIG. 1.

FIG. 5 is a diagram illustrating cam displacement of the cam surface portion 17A, namely a relation between the rotational angles C, O and a travel (distances $L_{cs}$, $L_{os}$ from the center O to the cam characteristics surface as shown in FIG. 3). In the figure, the characteristic line $L_c$ corresponds to the first cam surface portion $17A_c$, while the characteristic line $L_o$ corresponds to the second cam surface portion $17A_o$.

A line segment (H-E) in the characteristic line $L_c$ corresponds to the first cam characteristic surface portion $A17_{c1}$ and a line segment (E-G) corresponds to the second cam characteristic surface portion $17A_{c2}$, while a line segment (F-E) in the characteristic line $L_o$ corresponds to the second cam characteristic surface portion $17A_{o2}$ and a line segment (E-I) corresponds to the first cam characteristic surface portion $17A_{o1}$.

Herein the line segments (E-G), (F-E) correspond to a mode when a large load is required in the entire pulsation range of the diaphragm 7 in cases of the always-closed type and always-open type respectively, in other words to a mode when the vale is almost completely or completely closed, but either line segment is a straight line having a certain slope, so that, if a driving force of the piston 19 generated by a pressure compressed air, namely a force generated by rotation of the cam pinion 17 is kept at a constant level, a constant load is applied to the diaphragm 17 regardless of the rotational angles C, O of the cam pinion 17. In other words, a power amplifying ratio by a power amplifying mechanism comprising the cam pinion 17 or others when the driving mechanism comprising the piston 18 or others can be kept at a constant level.

A line segment (H-E) in the characteristic line $L_c$ and a line segment (E-I) in the characteristic line $L_o$ correspond to a mode when a small load is required for the diaphragm 7 in cases of the always-closed type and always-open type respectively, namely in a mode when an operation for closing the valve is started. In the present embodiment, although the slope is slightly larger than that when a large load is required as described above, the line segments are set to a straight line having a certain slope respectively, and like in the case where a large load is required, if a force generated by rotation of the cam pinion 17 is kept at a constant level, a constant load is applied to the diaphragm 7. It should be noted that the second cam characteristic surface portions $17A_{c2}$, $17A_{o2}$ may be formed so that a rotational angle and a power amplifying ratio of the cam surface portion 17 satisfy a prespecified subordinate relation, and also so that a change in a rotational angle of the cam pinion 17 and a load to the diaphragm 7 satisfy a non-subordinate relation. The configuration as described above is allowable because a loaded weight may be small when an operation for closing the valve is started before the diaphragm contacts a valve head section of the seal portion 5.

Next description is made for an example of operation in the present embodiment constructed as described above.

FIG. 1 shows a state where the valve hole 4 has fully been opened, namely when no load is applied to the diaphragm 7. In this state, when a pressure of compressed air supplied to a pressure receiving surface of the piston 19 is reduced to a prespecified level, the piston 19 goes up due to the energizing force of the return spring 20, and also the rack portion 19A integrally formed with the piston 19 moves upward.

With this operation, abutting and rotation of the pinion portion 17B of the cam pinion 17 is started, and the upper stem 13 and the lower stem 9 start moving downward. And, when the cam pinion 17 has rotated by a range of the first cam characteristics surface portion $17A_{o1}$, the diaphragm 7 contacts a valve head section of the seal portion 5, and subsequently (after passing the point E shown in FIG. 5) the upper step 13 and lower step 9 move downward, following movement of the second cam characteristic surface portion $17A_{o2}$ and applying a constant load to the diaphragm 7. And when the cam pinion has rotated by a prespecified rotational angle C, for instance, by 60 degrees, the valve hole 4 is completely closed by the diaphragm 7.

In this case, as the cam surface portion 17 contacts the upper stem 13 via the aligning ball 16, so that aligning between the cam surface portion 17A and the upper stem 13 or other component can smoothly be executed by making use of rotation of the ball 16.

Figure 6:
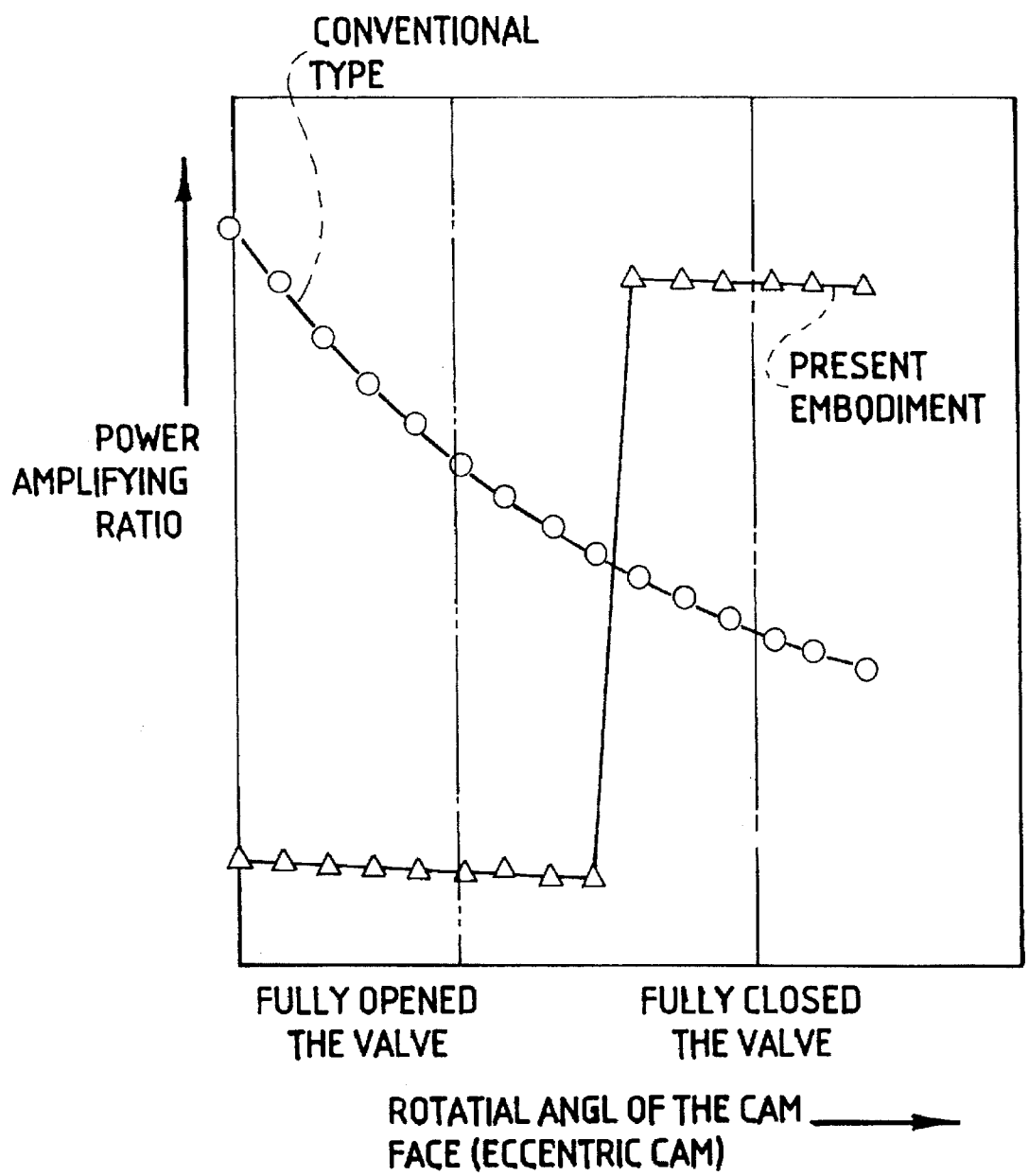
FIG. 6 is a graph illustrating a relation between a power increase ratio and a rotating angle of the cam surface portion or an eccentric cam.

FIG. 6 shows relations between a rotational angle of the cam surface portion 17 of the cam pinion and a power amplifying ratio in the present embodiment as well as in a case where the conventional type of eccentric cam is used. As understood from this figure, the present embodiment, the power in amplifying ratio is kept at a substantially constant value when the valve has almost completely or completely been opened, and the value becomes larger but is kept at a substantially constant level when the valve has almost completely or completely been closed. Namely this configuration provides the pulsation characteristics suited to the diaphragm that a load is kept at a small value when an operation for closing the valve is started and is kept at a large value when the valve has almost completely been closed.

In contrast, in the configuration using the conventional type of eccentric cam, the power amplifying ratio monotonously decreases according to a change of rotational angle, and in addition the load is kept at a maximum level when an operation for closing the valve is started, while the load is kept at a minimum level when the valve has almost completely been closed.

The present configuration corresponds to the always-closed type, and as an excessive load is applied during normal operation, 2 pieces of the return spring 20 are provided, and when corresponding to the always-open type, the load relation becomes contrary to that in the normal state of the diaphragm 7. Namely no load is applied in the normal state, so that only one piece of return spring 20 is required.

Embodiment 2

Figure 7:
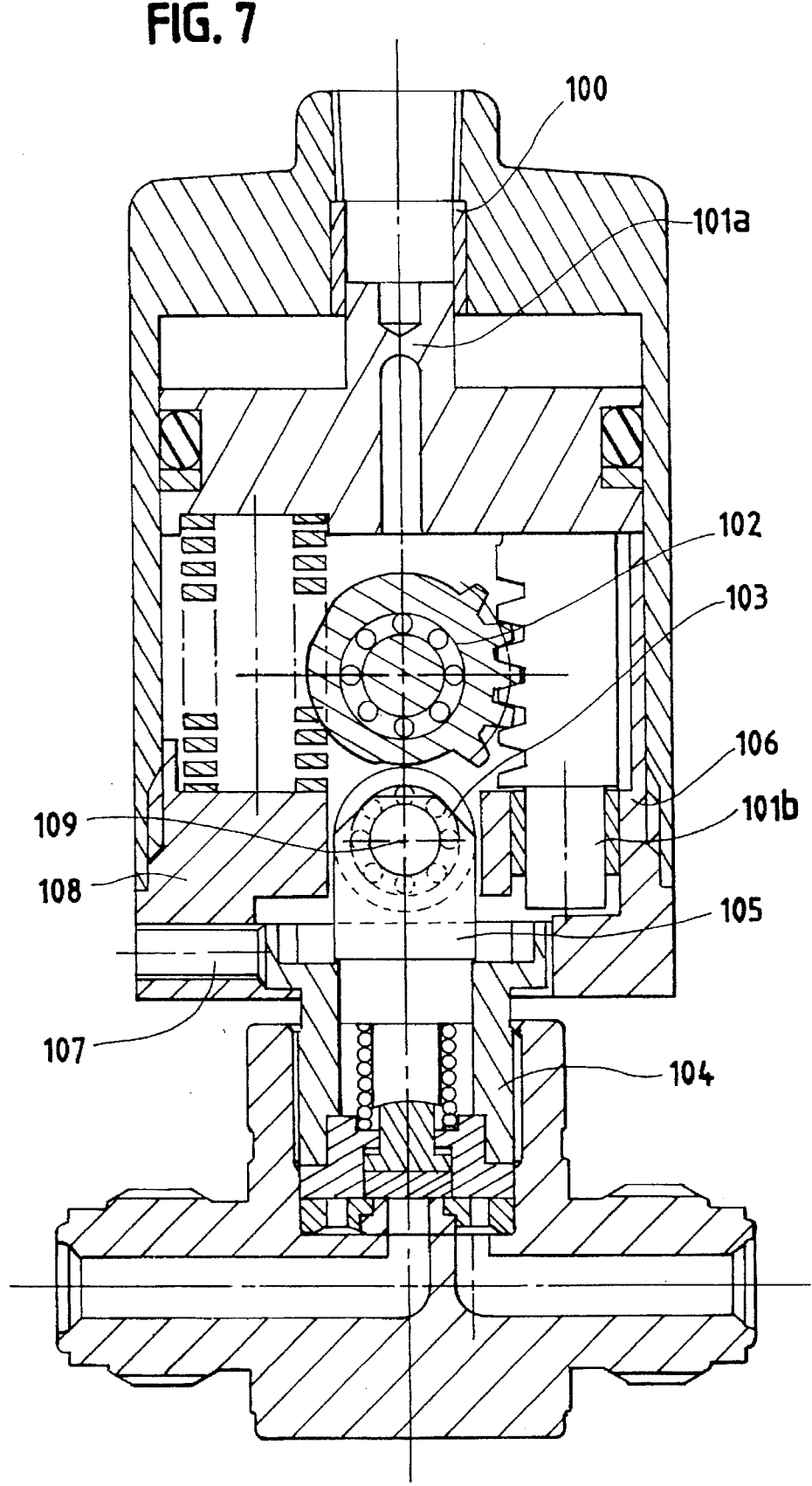
FIG. 7 is a deformed example in a case where a ball 16, a stem 13, and O-ring 14 are removed from FIG. 1.

FIG. 7 shows another embodiment of the present invention.

The embodiment shown in FIG. 7 is a variation of the configuration shown in FIG. 1, from which the ball 16, stem 13, and O-ring 14 have been removed.

Also the following improvements have been added thereto.

The surface of the cam pinion contacted by the ball in the cam pinion 17 was changed to a flat one. The actuator housing 11 (valve body screw section) was divided to two portions; an actuator housing and a bonnet with a bush hole for guiding a lower section of the rack added anew and also with the rack guide portion 11c removed therefrom. Also guides are added to above the rack piston 19 and under the rack. In addition a guide bush hole was added to upper section of the actuator cover 12.

Parts added in FIG. 7 are as follows.

Rack piston guides 101a, 101b added to above the piston and under the rack, bushes 100 for rack piston guides 101a, 101b, two pieces of needle-shaped roller 102 set in the right and left sides of the bearing hole 106 in the actuator housing, a needle-shaped roller with external wheels 103, a bonnet 104, a stem 105 on which the roller with external wheels 103 can be mounted, a stop screw 107 for setting the bonnet and the actuator housing.

With the present embodiments, the following effects can be achieved.

By providing the wrapping guide 101a above the rack piston 19 and also providing a wrapping guide 101b under the rack, operation of the rack piston can be stabilized.

By using the needle-shaped roller 102 and the needle-shaped roller with external wheels 103, it becomes possible to minimize the frictional resistance during operation.

By dividing the actuator housing 11 into the actuator housing 108 and bonnet 104 and fixing the two with the screw 107, it becomes possible to set lift when the valve is assembled.

By press fitting the bushes for guide 100, 106 into holes into which the wrapping guides 101a and 101b are inserted, resistance during operation of the rack piston is reduced.

Namely by providing guides above and under the rack piston 19 and setting needle-shaped rollers on the cam pinion 17 and stem 105, transfer loss is reduced, and output can be increased.

INDUSTRIAL APPLICABILITY

With the invention of claim 1, a space for providing in the cylindrical housing is effectively utilized as much as possible as compared to the conventional type thereof, which makes it possible to realize its minimization. More particularly, a piston and a return spring each constituting a driving mechanism and a cam pinion and a rack portion each constituting a power amplifying mechanism can efficiently be accommodated in one cylindrical housing. Also as the cylindrical housing has a simple cylindrical shape as a whole, the whole external shape is enhanced, the convenience in handling is improved, and in a case where, for instance, a plurality of shut-off valves are provided side by side, a length in a direction of their alignment can largely be reduced, and simultaneously unnecessary physical interference arisen between adjoining shut-off valves can be avoided, and efficiency of working on designing of a piping system or installation thereof can be improved thereby.

More particularly, in a cam pinion, a cam surface portion has been designed to be integrated into a pinion portion, while a piston has been designed to be integrated into a rack portion, which can contribute to reduction of a number of parts thereof, and also contribute to reduction of a number of processes for assembling.

With the invention of claim 2, configuration of the housing portion is as simple as the fact that an actuator cover portion is attached to the actuator housing portion, so that assembly of the housing is simple, and also a cylindrical shape as a whole can easily be realized.

Also with the invention of claim 3, a diaphragm, a stem, a cam pinion, and a piston or the like are provided in a series in the axial direction of the cylinder, so that a longitudinal shape thereof as a whole can contribute to simplification of its shape. Further the direction of supplying compressed air to a pressure receiving surface of the piston becomes substantially vertical to the pressure receiving surface of the piston, so that driving efficiency can be improved. Furthermore a rotational center of the cam pinion can coincide with a rotational center of the cam surface portion, a diagram of the cam displacement can easily be designed.

With the invention of claim 4, a range from a power amplifying mechanism of the cam pinion or the like to a portion of a driving mechanism a rack portion or the like is accommodated in a space for accommodation in the actuator housing portion, attachment thereto of the actuator cover portion can be easier.

With the invention of claim 5, a cam pinion and a stem can adequately be aligned, stable pulsation of a diaphragm can be expected.

With the invention of claim 6, a cam surface portion and a pinion portion can efficiently be used.

With the invention of claim 7, design of a cam displacement line is easy and a position of a stem is dominated by the position of the bearing of cam pinion, so that it is not necessary to provide an adjusting mechanism for a position of the stem.

With the inventions of claim 8 and claim 9, assuming that a driving force of a driving mechanism is at constant level, a desired specified load can be added to the diaphragm when in a state of maximum load around a timing when the valve is completely closed, on the other hand, pulsating displacement of the diaphragm can be executed in any of the loaded state when in a state of minimum load around a timing when the valve is completely opened, which becomes sufficiently appropriate to pulsating characteristics of the diaphragm. Subsequently, the dispersion of reciprocal movement characteristics of a high pressure shut-off valve can be omitted.

With the invention of claim 10, by only operation of changing a location of one of cam pinions, the cam portion can be corresponded to an always-closed type or an always-open type thereof.

With the invention of claim 11, a number of attachments of the return springs can be selected according to its specification, more particularly in a case where an always-open type is selected, a number of parts thereof can be reduced, which is convenient.

We claim:

1. A diaphragm type high pressure shut-off valve having a diaphragm for opening and closing a valve port that is in flow communication with gas piping means for controlling a changing pressure of a gas flow within said gas piping means, and comprising a cylindrical housing having a supply unit for receiving compressed air at one end thereof in an axial direction, a piston provided in the housing and adapted to reciprocate in response to a change in pressure of said compressed air, a return spring provided in the housing so as to energize said piston against the change in pressure of said compressed air, a rack portion provided integrally with and extending from said piston and also having abutting teeth provided along the direction of the reciprocal movement of said piston, and a cam pinion having a pinion portion cooperatively engaging said rack portion teeth and also a cam surface portion integrally provided thereon and spaced from said pinion portion and also having a rotating shaft borne by said housing and extending in a direction crossing said axial direction of said cylinder at right angles, wherein rotational displacement of said cam surface portion of said pinion causes the cooperative engagement between the rack portion teeth and said pinion portion by the reciprocating movement of said piston, while simultaneously said cam surface portion cooperatively engages a stem connected to the diaphragm to apply varying force to variably control the opening and closing of said shut-off valve.

2. A diaphragm type high pressure shut-off valve according to claim 1, wherein said housing comprises an actuator housing portion having a space for accommodation at a substantially central portion thereof, and a substantially bottom-less cylindrical actuator cover portion attached to said actuator housing portion for covering the latter.

3. A diaphragm type high pressure shut-off valve according to claim 1, wherein said supply unit for said compressed air including a central portion of a surface of said piston for receiving a pressure of said compressed air, a center of a rotating shaft of said cam pinion, a shaft core of said stem, and a central portion of a pulsing surface of said diaphragm are located in a series in said axial direction of said cylinder.

4. A diaphragm type high pressure shut-off value according to claim 2, wherein said cam pinion and stem are provided in a series in said space for accommodation in said actuator housing portion and also said return spring and said rack portion are accommodated therein.

5. A diaphragm type high pressure shut-off valve according to any of claims 1 through 4, wherein said cam pinion has said cam surface portion contacted through an aligning ball to said stem.

6. A diaphragm type high pressure shut-off valve according to any of claims 1 through 5, wherein said cam pinion is generally disk-formed, said pinion is presented in the substantially semi-circular portion, and a cam surface portion is formed in another substantially semi-circular portion.

7. A diaphragm type high pressure shut-off valve according to any of claims 1 through 6, wherein said cam surface portion has the cam displacement characteristics that the travelling distance varies according to a center of a rotating shaft of said cam pinion.

8. A diaphragm type high pressure shut-off valve according to claim 1, wherein said cam surface portion has a first cam characteristics surface portion formed so that a power amplifying ratio which is a ratio of said pressurizing force versus a load to the diaphragm is kept at a substantially constant level against a change in the rotating angle, and a second cam characteristics surface portion.

9. A diaphragm type high pressure shut-off valve according to claim 8, wherein said first cam characteristic surface portion corresponds to a portion having a larger pulsation rate in an entire pulsating portion of said diaphragm, and said second cam characteristics surface portion corresponds to a remaining portion having a smaller pulsation rate.

10. A diaphragm type high pressure shut-off valve according to claim 8 or claim 9, wherein said cam surface portion is formed so that it encloses a first cam surface portion corresponding to an always-closed type in which said valve hole is closed when a pressure by said compressed air is reduced and a second cam surface portion corresponding to an always-open type in which said valve hole is opened when a pressure by said compressed air is reduced.

11. A diaphragm type high pressure shut-off valve according to claim 10, wherein said return spring comprises a coil spring in which said energizing force can selectively be set.

12. A diaphragm type high pressure shut-off valve according to claim 8, wherein said second cam characteristics surface portion is formed so that said power increase ratio is dependent in a prespecified relation on a change in the rotating angle.

13. A diaphragm type high pressure shut-off valve according to claim 8, wherein said second cam characteristics surface portion is formed so that said power increase ratio is independent of a change in rotating angle.

* * * * *